United States Patent
Kang et al.

(10) Patent No.: US 9,306,724 B2
(45) Date of Patent: Apr. 5, 2016

(54) APPARATUS AND METHOD FOR AVOIDING INTERFERENCE BETWEEN ACCESS POINTS

(71) Applicant: Electronics and Telecommunications Research Institute, Daejeon (KR)

(72) Inventors: Hyun Duk Kang, Gwangju (KR); Hoi Yoon Jung, Daejeon (KR); Gwang Zeen Ko, Daejeon (KR); Myung Sun Song, Daejeon (KR); Jae Ick Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 34 days.

(21) Appl. No.: 13/919,543

(22) Filed: Jun. 17, 2013

(65) Prior Publication Data

US 2014/0177546 A1    Jun. 26, 2014

(30) Foreign Application Priority Data

Dec. 26, 2012  (KR) .................. 10-2012-0153355

(51) Int. Cl.

| | | |
|---|---|---|
| *H04L 5/06* | (2006.01) | |
| *H04L 5/00* | (2006.01) | |
| *H04W 16/14* | (2009.01) | |
| *H04W 74/00* | (2009.01) | |
| *H04W 72/08* | (2009.01) | |
| *H04W 28/16* | (2009.01) | |
| *H04W 84/12* | (2009.01) | |

(52) U.S. Cl.
CPC ............. *H04L 5/06* (2013.01); *H04L 5/0073* (2013.01); *H04W 16/14* (2013.01); *H04W 28/16* (2013.01); *H04W 72/082* (2013.01); *H04W 74/002* (2013.01); *H04L 5/0007* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2003/0040319 A1* | 2/2003 | Hansen et al. ................. | 455/452 |
| 2005/0025265 A1 | 2/2005 | D'Amico et al. | |
| 2006/0072492 A1* | 4/2006 | Trainin ............. | H04W 74/0816 370/328 |
| 2006/0217067 A1* | 9/2006 | Helbig .......................... | 455/63.1 |
| 2007/0149230 A1* | 6/2007 | Song et al. .................... | 455/515 |
| 2008/0102845 A1* | 5/2008 | Zhao ............................... | 455/450 |

(Continued)

FOREIGN PATENT DOCUMENTS

| | | |
|---|---|---|
| JP | 2010193403 A | 2/2010 |
| KR | 1020110119520 A | 11/2011 |

OTHER PUBLICATIONS

Author Unknown, Getting Started Guide for the Ornico AP-1000, pp. 1-39, as retrieved from the internet archive, www.archive.org, on Dec. 13, 2006.*

(Continued)

*Primary Examiner* — Christopher Crutchfield
(74) *Attorney, Agent, or Firm* — William Park & Associates Ltd.

(57) ABSTRACT

The present invention relates to an apparatus and a method for avoiding signal interference between access points (APs) in a non-license band, and more particularly, an interference avoidance apparatus and method between access points (APs) that avoid interference based on whether an overlapping basic service set (OBSS) is present, whether an overlapping operation channel between adjacent APs is used, whether it is possible to select a non-overlapping operation channel between adjacent APs, and the like.

11 Claims, 4 Drawing Sheets

(56) References Cited

U.S. PATENT DOCUMENTS

| | | | |
|---|---|---|---|
| 2011/0166401 A1* | 7/2011 | Roth | B01J 29/70 585/422 |
| 2013/0058310 A1* | 3/2013 | Park et al. | 370/331 |
| 2014/0086212 A1* | 3/2014 | Kafle et al. | 370/331 |
| 2014/0140328 A1* | 5/2014 | Ling et al. | 370/336 |

OTHER PUBLICATIONS

IEEE Computer Society, Part 11: Wireless LAN Medium Access Control (MAC) and Physical Layer (PHY) Specifications, IEEE Standard for Information technology—Telecommunications and information exchange between systems, May 29, 2012, pp. 1-162, The Institute of Electrical and Electronics Engineers, Inc., New York, NY.

* cited by examiner

APPARATUS AND METHOD FOR AVOIDING INTERFERENCE BETWEEN ACCESS POINTS

CROSS-REFERENCE TO RELATED APPLICATIONS

This application claims priority to and the benefit of Korean Patent Application No. 10-2012-0153355 filed in the Korean Intellectual Property Office on Dec. 26, 2012, the entire contents of which are incorporated herein by reference.

TECHNICAL FIELD

The present invention relates to an apparatus and a method for avoiding signal interference between access points (APs), and more particularly, an apparatus and a method for avoiding signal interference between APs in a non-license band.

BACKGROUND ART

Currently, mobile devices such as a smart phone, a tablet personal computer (PC), and the like, are distributed and use thereof is also gradually expanded. Accordingly, use of wireless-fidelity (Wi-Fi) using a non-license band is significantly increasing. In the case of Internet traffic, a half of the Internet traffic depends on Wi-Fi. Therefore, interference between Wi-Fi devices connected to adjacent different access points (APs), that is, belonging to different basic service sets (BSSs) is increasing day by day. In particular, in 802.11ac of which standardization is currently in progress, bands at 20 MHz, 40 MHz, 80 MHz, and 160 MHz, which are relatively wide frequency bands compared to 802.11n using bands only at 20 MHz and 40 MHz, are determined to be available and thus, the probability of using a partially overlapping or a completely overlapping channel between adjacent APs is further increasing. Accordingly, to efficiently use frequency resources, solving interference between overlapping basic service sets (OBSSs) becomes an important issue.

To solve an interference issue between OBSSs found in the existing 802.11 standard technology, the Institute of Electrical and Electronics Engineers (IEEE) 802 standardization group proposes an OBSS management method in 802.11aa of which standardization was completed in May of 2012 and an 802.11ac amendment standard in progress. The OBSS management method discloses a method of providing information for selecting an operation channel between an AP and a neighboring AP through OBSS management, an access control mechanism, a method of sharing a channel between OBSSs based on the scheduled concept of transmission opportunity (TXOP), and the like. The TXOP is based on a hybrid coordination function (HCF) controlled channel access (HCCA) protocol that is an HCF non-contention channel access scheme. The HCCA protocol integrally manages transmission of each of stations (STAs) at an AP using a non-contention based channel access scheme using a polling mechanism.

An OBSS interference avoidance method based on the HCCA protocol causes inconvenience in that since transmission between all of the STAs is integrally managed at an AP, a large amount of information required for this needs to be exchanged between adjacent APs. There is an issue in that interference avoidance and resource allocation through scheduling at the AP causes significant overhead in the entire network.

SUMMARY OF THE INVENTION

The present invention has been made in an effort to provide an interference avoidance apparatus and method between access points (APs) that avoid interference based on whether an overlapping basic service set (OBSS) is present, whether an overlapping operation channel between adjacent APs is used, whether it is possible to select a non-overlapping operation channel between adjacent APs, and the like.

However, the object of the present invention is not limited to the aforementioned matter and thus, other objects not described herein will be clearly understood to those skilled in the art from the following description.

An exemplary embodiment of the present invention provides an apparatus for avoiding interference between APs, the apparatus including: an adjacent AP presence determining unit configured to determine whether a second AP adjacent to a first AP is present; an operation channel overlapping determining unit configured to determine whether an operation channel of the first AP and an operation channel of the second AP overlap, when the second AP is determined to be present; a non-overlapping channel setting determining unit configured to determine whether setting of a non-overlapping operation channel is possible when the operation channel of the first AP and the operation channel of the second AP are determined to overlap; and a channel use controlling unit configured to control the operation channel of the first AP to be shared with the second AP when setting of the non-overlapping operation channel is determined to be impossible.

The adjacent AP presence determining unit exchanges a message between the first AP and an AP belonging to a basic service set (BSS) different from the first AP, to thereby determine whether an OBSS is present, and determines the AP belonging to the OBSS as the second AP when the OBSS is present.

When the second AP is determined to be absent, or when the operation channel of the first AP and the operation channel of the second AP are determined not to overlap, the channel use controlling unit controls the first AP to use an allocated operational channel. The channel use controlling unit controls the first AP to use the allocated operation channel based on a carrier sense multiple access/collision avoidance (CSMA/CA) protocol.

The operation channel overlapping determining unit determines whether the operation channel of the first AP and the operation channel of the second AP overlap by receiving information about the operation channel of the second AP, and comparing the received information with the operation channel of the first AP.

When setting of the non-overlapping operation channel is determined to be possible, the channel use controlling unit controls the operation channel of the first AP to be changed with a channel that non-overlaps the operation channel of the second AP. The channel use controlling unit may control the operation channel of the second AP to be changed with a channel that non-overlaps the operation channel of the first AP.

When setting of the non-overlapping operation channel is determined to be impossible, the channel use controlling unit determines a time section to be used by the first AP for data communication in a shared channel. In the present exemplary embodiment, the time section to be used by the first AP for the data communication is defined as a virtual network allocation vector (VNAV) section.

The channel use controlling unit notifies an AP or a wireless device, belonging to the same BSS as the first AP, with information about the time section, and disallows the AP or the wireless device belonging to the same BSS as the first AP to use the shared channel in the time section.

The interference avoidance apparatus is mounted to the first AP to be used for data communication between heterogeneous wireless devices, or is mounted to a wireless device that desires to communicate with another wireless device through the first AP.

Another exemplary embodiment of the present invention also provides a method for avoiding interference between APs, the method including: an adjacent AP presence determining operation of determining whether a second AP adjacent to a first AP is present; an operation channel overlapping determining operation of determining whether an operation channel of the first AP and an operation channel of the second AP overlap, when the second AP is determined to be present; a non-overlapping channel setting determining operation of determining whether setting of a non-overlapping operation channel is possible when the operation channel of the first AP and the operation channel of the second AP are determined to overlap; and a channel sharing controlling operation of controlling the operation channel of the first AP to be shared with the second AP when setting of the non-overlapping operation channel is determined to be impossible.

The adjacent AP presence determining operation exchanges a message between the first AP and an AP belonging to a BSS different from the first AP, to thereby determine whether an OBSS is present, and determines the AP belonging to the OBSS as the second AP when the OBSS is present.

After the adjacent AP presence determining operation, the interference avoidance method further includes a first channel use controlling operation of controlling the first AP to use an allocated operation channel when the second AP is determined to be absent.

After the operation channel overlapping determining operation, the interference avoidance method further includes a second channel use controlling operation of controlling the first AP to use the allocated operation channel when the operation channel of the first AP and the operation channel of the second AP are determined to non-overlap.

After the non-overlapping channel setting determining operation, the interference avoidance method further includes a channel change controlling operation of controlling the operation channel of the first AP to be changed with a channel that non-overlaps the operation channel of the second AP when setting of the non-overlapping operation channel is determined to be possible. In the channel change controlling operation, it is also possible to control the operation channel of the second AP with a channel that non-overlaps the operation channel of the first AP.

The channel sharing controlling operation determines a time section to be used by the first AP for data communication in a shared channel when setting of the non-overlapping operation channel is determined to be impossible.

The channel sharing controlling operation notifies an AP or a wireless device, belonging to the same BSS as the first AP, with information about the time section, and disallows the AP or the wireless device belonging to the same BSS as the first AP to use the shared channel in the time section.

The interference avoidance method is performed in the case of data communication between heterogeneous wireless devices, or performed by a wireless device that desires to communicate with another wireless device through the first AP.

According to an interference avoidance apparatus and method based on time-division transmission scheme between BSSs proposed in exemplary embodiments of the present invention, it is possible to maximize the efficiency of sharing a frequency between heterogeneous wireless-fidelity (Wi-Fi) devices that are adjacent to each other and operable in a non-license band, and to solve an interference issue between OBSSs. It is also possible to effectively share a channel while minimizing overhead in the entire network by simply exchanging a message between APs.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
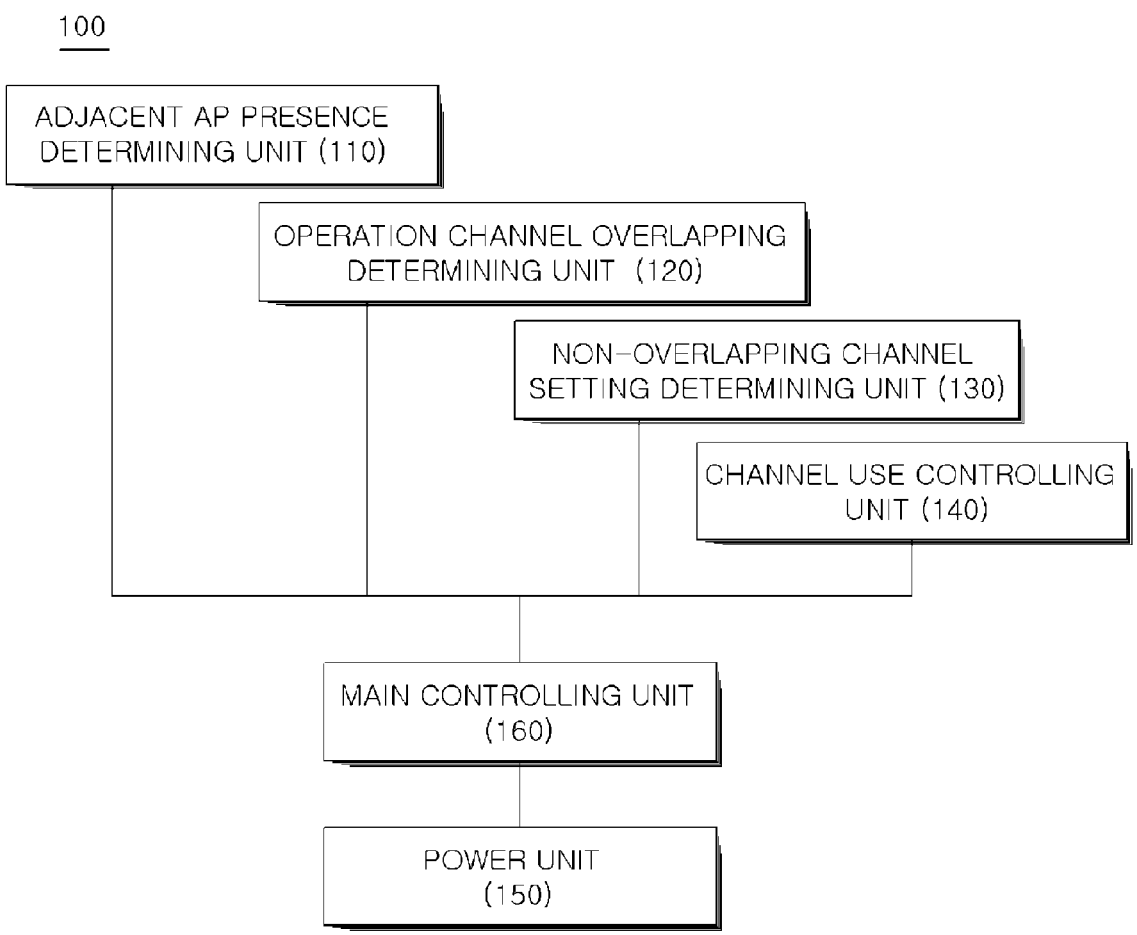
FIG. 1 is a block diagram schematically illustrating an internal configuration of an interference avoidance apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Initially, in assigning reference numerals to constituent elements of each drawing, it should be noted that like reference numerals refer to like constituent elements even though they are illustrated in different drawings. When it is determined that the detailed description related to a related known function or configuration may make the purpose of the present invention unnecessarily ambiguous in describing the present invention, the detailed description will be omitted here. Even though the exemplary embodiments of the present invention will be described in the following, the technical spirit of the present invention is not limited thereto or restricted thereby and may be variously modified and thereby implemented by those skilled in the art.

The present invention aims to propose an apparatus and a method for solving interference between basic service sets (BSSs), that is, an interference issue between overlapping BSSs (OBSS), which occurs when sharing a frequency between adjacent heterogeneous wireless fidelity (Wi-Fi) devices in a wireless local area network (WLAN) system using a non-license band.

FIG. 1 is a block diagram schematically illustrating an internal configuration of an interference avoidance apparatus 100 according to an exemplary embodiment of the present invention. Referring to FIG. 1, the interference avoidance apparatus 100 includes an adjacent access point (AP) presence determining unit 110, an operation channel overlapping determining unit 120, a non-overlapping channel setting determining unit 130, a channel use controlling unit 140, a power unit 150, and a main controlling unit 160.

The interference avoidance apparatus 100 is mounted to a first AP to be used for data communication between heterogeneous wireless devices, or is mounted to a wireless device that desires to communicate with another wireless device through the first AP.

The adjacent AP presence determining unit 110 serves to determine whether a second AP adjacent to the first AP is present. The adjacent AP presence determining unit 110 exchanges a message between the first AP and an AP belonging to a BSS different from the first AP, to thereby determine whether an OBSS is present, and determines the AP belonging to the OBSS as the second AP when the OBSS is present.

When the second AP is determined to be present, the operation channel overlapping determining unit 120 serves to determine whether an operation channel of the first AP and an operation channel of the second AP overlap. The operation channel overlapping determining unit 120 may determine whether the operation channel of the first AP and the operation channel of the second AP overlap by receiving information about the operation channel of the second AP, and comparing the received information with the operation channel of the first AP.

When the operation channel of the first AP and the operation channel of the second AP are determined to overlap, the non-overlapping channel setting determining unit 130 serves to determine whether setting of a non-overlapping operation channel is possible.

When the second AP is determined to be absent, or when the operation channel of the first AP and the operation channel of the second AP are determined to non-overlap, the channel use controlling unit 140 serves to control the first AP to use an allocated operational channel. Here, the channel use controlling unit 140 may control the first AP to use the allocated operation channel based on a carrier sense multiple access/collision avoidance (CSMA/CA) protocol.

When setting of the non-overlapping operation channel is determined to be possible, the channel use controlling unit 140 serves to control the operation channel of the first AP to be changed with a channel that non-overlaps the operation channel of the second AP. The channel use controlling unit 140 may control the operation channel of the second AP to be changed with a channel that non-overlaps the operation channel of the first AP.

When setting of the non-overlapping operation channel is determined to be impossible, the channel use controlling unit 140 serves to control the operation channel of the first AP to be shared with the second AP. Here, the channel use controlling unit 140 may determine a time section to be used by the first AP for data communication in a shared channel. In the present exemplary embodiment, the time section to be used by the first AP for the data communication is defined as a virtual network allocation vector (VNAV) section. The channel use controlling unit 140 notifies an AP or a wireless device, belonging to the same BSS as the first AP, with information about the time section, and disallows the AP or the wireless device belonging to the same BSS as the first AP to use the shared channel in the time section.

The power unit 150 serves to supply power to each of the constituent elements that constitute the interference avoidance apparatus 100.

The main controlling unit 160 serves to control the overall operation of each of the constituent elements that constitute the interference avoidance apparatus 100.

Figure 2:
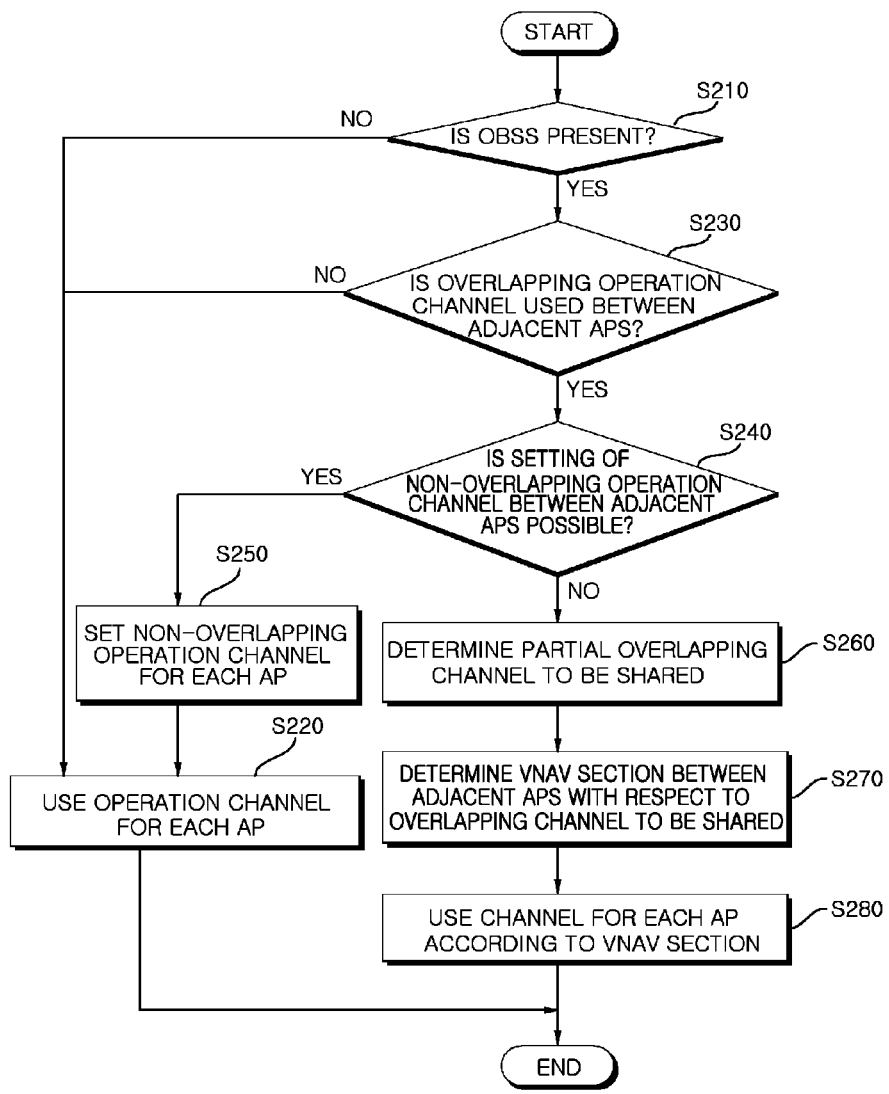
FIG. 2 is a flowchart illustrating an interference avoidance method according to an exemplary embodiment of the present invention.

The present invention proposes an interference avoidance apparatus and method for solving an interference issue between OBSSs in order to maximize the efficiency of sharing a frequency between adjacent heterogeneous Wi-Fi devices using a non-license band. Next, an interference avoidance method of an interference avoidance apparatus will be described. FIG. 2 is a flowchart illustrating an interference avoidance method according to an exemplary embodiment of the present invention.

The interference avoidance method of FIG. 2 is performed for data communication between heterogeneous wireless devices, or performed by a wireless device that desires to communicate with another wireless device through a first AP.

Initially, the adjacent AP presence determining unit 110 determines whether a second AP adjacent to the first AP is present. When the second AP is determined to be absent, the channel use controlling unit 140 controls the first AP to use an allocated operation channel. On the contrary, when the second AP is determined to be present, the operation channel overlapping determining unit 120 determines whether an operation channel of the first AP and an operation channel of the second AP overlap.

When the operation channel of the first AP and the operation channel of the second AP are determined to non-overlap, the channel use controlling unit 140 controls the first AP to use the allocated operation channel. On the contrary, when the operation channel of the first AP and the operation channel of the second AP are determined to overlap, the non-overlapping channel setting determining unit 130 determines whether setting of a non-overlapping operation channel is possible.

When setting of the non-overlapping operation channel is determined to be possible, the channel use controlling unit 140 controls the operation channel of the first AP to be changed with a channel that non-overlaps the operation channel of the second AP. Here, the channel use controlling unit 140 may also control the operation channel of the second AP to be changed with a channel that non-overlaps the operation channel of the first AP.

On the contrary, when setting of the non-overlapping operation channel is determined to be impossible, the channel use controlling unit 140 controls the operation channel of the first AP to be shared with the second AP. Here, the channel use controlling unit 140 determines a time section to be used by the first AP for data communication in a shared channel, notifies an AP or a wireless device, belonging to the same BSS as the first AP, with information about the time section, and disallows the AP or the wireless device belonging to the same BSS as the first AP to use the shared channel in the time section.

Hereinafter, the aforementioned interference avoidance method will be arranged one more time with reference to FIG. 2.

Each AP verifies the presence of an adjacent AP by exchanging a message between APs and thereby determines whether an OBSS is present (S210).

When the OBSS is absent, it indicates that the adjacent AP causing interference in the case of using the same channel is absent and thus, an existing channel sharing scheme, for example, a CSMA/CA scheme is used (S220).

When the OBSS is present, it is classified into the following two cases based on whether an operation channel overlaps between adjacent APs by exchanging information about operation channels of the adjacent APs (S230).

When the operation channel non-overlaps between the adjacent APs, it indicates a case in which each AP uses a different operation channel and thus, interference does not occur between the adjacent APs. Accordingly, each AP uses an independent operation channel (S220).

When the operation channel overlaps between the adjacent APs, whether setting of a non-overlapping operation channel is possible is determined by exchanging a message with the adjacent AP (S240).

Next, when setting of the non-overlapping operation channel is possible, the non-overlapping operation channel for each AP is set (S250) and each AP uses the independent operation channel (S220).

When setting of the non-overlapping operation channel is impossible, an overlapping channel to be shared between the adjacent APs is determined with respect to an overlapping channel among the existing operation channels (S260). An overlapping operation channel between the adjacent APs may be divided into a partial overlapping case and a complete overlapping case. A NAV section between adjacent APs is determined with respect to the overlapping channel to be shared (S270). In the present exemplary embodiment, this section is defined as a virtual NAV section, that is, a VNAV section. After determining the VNAV section, each AP and stations (STAs) within a corresponding BSS suspend channel use for the adjacent AP and STAs within a corresponding BSS, in a corresponding VNAV (S280).

Figure 3:
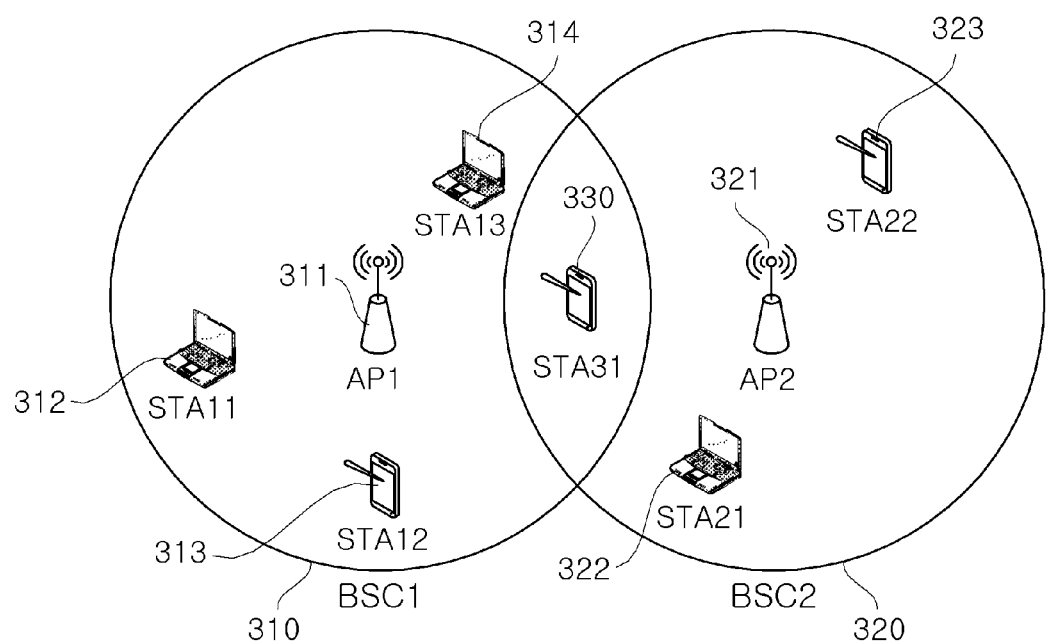
FIG. 3 is a diagram illustrating an example of an overlapping basic service set (OBSS) in which interference between adjacent heterogeneous wireless-fidelity (Wi-Fi) devices occurs.

FIG. 3 is a diagram illustrating an example of an OBSS in which interference between adjacent heterogeneous Wi-Fi devices occurs. AP1 311 constitutes a BSS, that is, BSC1 310 together with STA11 312, STA12 313, STA13 314, and STA31 330. AP2 321 constitutes BSC2 320 together with STA21 322, STA22 323, and STA31 330. Here, STA31 330 is included in both BSC1 310 and BSC2 320. Two BSSs (BSC1 310 and BSC2 320) are adjacent to each other and form an OBSS.

Figure 4:
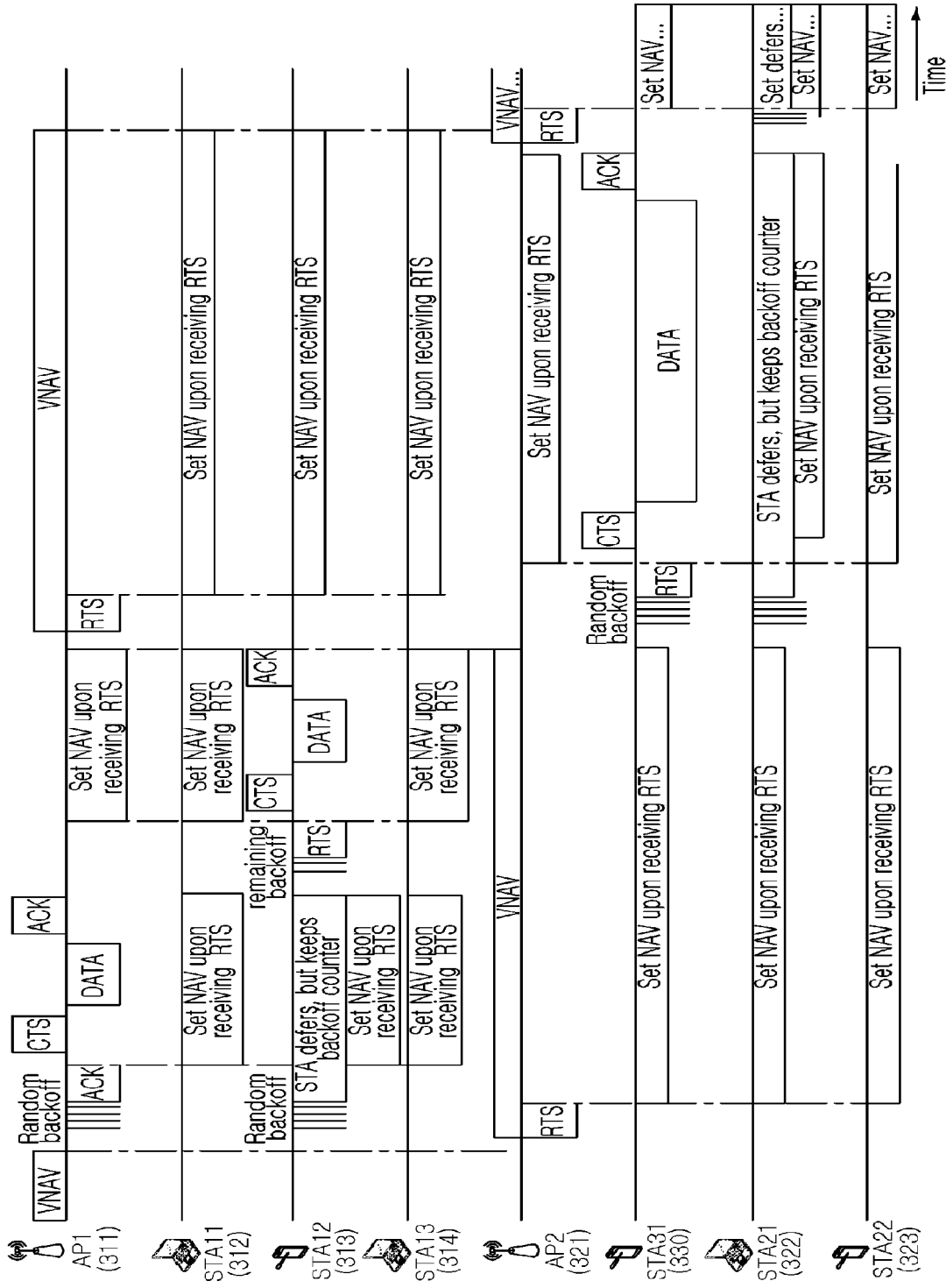
FIG. 4 is a diagram illustrating an example of sharing a channel between OBSSs.

FIG. 4 is a diagram illustrating an example of sharing a channel between OBSSs. FIG. 4 illustrates an exemplary embodiment of using a channel for each AP according to a VNAV section proposed in the present invention in the case in which each adjacent AP shares an overlapping operation channel as illustrated in FIG. 3.

AP1 311 and AP2 321 determine a VNAV section for exchanging a message, and each AP transmits a request to send (RTS) in order to suspend channel use of STAs belonging to a BSS of a corresponding AP in a corresponding VNAV section.

When the VNAV section is terminated, AP2 321 transmits the RTS after a short interframe space (SIFS) time. STA31 330, STA21 322, and STA22 323 within the BSS of AP2 321 receive an RTS signal from AP2 321 and then, set the same NAV as a termination point in time of the VNAV section and suspend channel use. Here, AP1 311, and STA11 312, STA12 313, and STA13 314 within the BSS of the AP1 311 use a channel using a CSMA/CA in the VNAV section of the AP2 321.

When the VNAV section of the AP2 321 is terminated, AP1 311 transmits the RTS after the SIFS time, which is similar to the method used by AP2 321. STA11 312, STA12 313, and STA13 314 within the BSS of the AP1 311 receive an RTS signal from the AP1 311 and then set the same NAV as a termination point in time of the VNAV section and suspend the channel use. Similarly, AP2 321, and STA31 330, STA21 322, and STA22 323 within the BSS of AP2 321 use a channel using the CSMA/CA in the VNAV section of the AP1 311.

In a case in which a starting point in time of the VNAV section of AP1 311 remains within a predetermined range immediately after the NAV section is terminated while using a channel in the BSS of the AP2 321 and thereby, new transmission within the BSS of AP2 321 is determined to be impossible, AP2 321 may transmit the RTS after the SIFS time when the corresponding NAV section is terminated.

All of the constituent elements configuring the exemplary embodiments of the present invention are described to be combined into one or to combined and thereby, but the present invention is not limited to the exemplary embodiments. That is, without departing from the scope of the present invention, all of the constituent elements may be selectively combined into at least one and thereby operate. Although each of all of the constituent elements is configured as single independent hardware, a portion of or all of the constituent elements may be selectively combined and thereby configured as a computer program having a program module that performs a portion of or all of the functions combined in single or a plurality of hardware. Such the computer program may be stored in computer-readable media such as a USB memory, a CD disk, a flash memory, and the like, and be read and executed by a computer, thereby embodying the exemplary embodiments of the present invention. Storage media of the computer program may include magnetic storage media, optical storage media, carrier wave media, and the like.

Unless differently defined in the detailed description, all of the terminologies including a technical terminology or a scientific terminology have the same meaning as a meaning generally understood by those skilled in the art. Generally used terminologies, such as a terminology defined in a dictionary, should be interpreted to match the contextual meaning of the related art and should not be interpreted as an idealistic or excessively formal meaning unless clearly defined in the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for avoiding interference between access points (APs), the apparatus comprising:
    an adjacent AP presence determining device configured to determine whether a second AP adjacent to a first AP is present;
    an operation channel overlapping determining device configured to determine whether an operation channel of the first AP and an operation channel of the second AP overlap, when the second AP is determined to be present;
    a non-overlapping channel setting determining device configured to determine whether setting of a non-overlapping operation channel is possible when the operation channel of the first AP and the operation channel of the second AP are determined to overlap; and
    a channel use controlling device configured to control the operation channel of the first AP to be shared with the second AP when setting of the non-overlapping operation channel is determined to be impossible, wherein when setting of the non-overlapping operation channel is determined to be impossible, the channel use controlling device determines a time section to be used by the first AP for data communication in a shared channel, wherein the time section to be used by the first AP for the data communication in the shared channel is a virtual network allocation vector (VNAV) section, the VNAV section between adjacent APs is determined with respect to an overlapping channel to be shared, and wherein after determining the VNAV section, each AP and stations (STAs) within a corresponding basic service set (BSS) suspend channel user for the adjacent AP and STAs within the corresponding BSS, in a corresponding VNAV.

2. The apparatus of claim 1, wherein the adjacent AP presence determining device exchanges a message between the first AP and an AP belonging to a basic service set (BSS) different from the first AP, to thereby determine whether an overlapping BSS (OBSS) is present, and determines the AP belonging to the OBSS as the second AP when the OBSS is present.

3. The apparatus of claim 1, wherein when the second AP is determined to be absent, or when the operation channel of the first AP and the operation channel of the second AP are determined to non-overlap, the channel use controlling device controls the first AP to use an allocated operational channel.

4. The apparatus of claim 1, wherein when setting of the non-overlapping operation channel is determined to be possible, the channel use controlling device controls the operation channel of the first AP to be changed with a channel that non-overlaps the operation channel of the second AP.

5. The apparatus of claim 1, wherein the channel use controlling device notifies an AP or a wireless device, belonging to the same BSS as the first AP, with information about the time section, and disallows the AP or the wireless device belonging to the same BSS as the first AP to use the shared channel in the time section.

6. The apparatus of claim 1, wherein the interference avoidance apparatus is mounted to the first AP to be used for data communication between heterogeneous wireless devices, or is mounted to a wireless device that desires to communicate with another wireless device through the first AP.

7. A method for avoiding interference between APs, the method comprising:

an adjacent AP presence determining operation of determining whether a second AP adjacent to a first AP is present;

an operation channel overlapping determining operation of determining whether an operation channel of the first AP and an operation channel of the second AP overlap, when the second AP is determined to be present;

a non-overlapping channel setting determining operation of determining whether setting of a non-overlapping operation channel is possible when the operation channel of the first AP and the operation channel of the second AP are determined to overlap; and a channel sharing controlling operation of controlling the operation channel of the first AP to be shared with the second AP when setting of the non-overlapping operation channel is determined to be impossible, wherein the channel sharing controlling operation determines a time section to be used by the first AP for data communication in a shared channel when setting of the non-overlapping operation channel is determined to be impossible, and wherein the time section to be used by the first AP for the data communication in the shared channel is a virtual network allocation vector (VNAV) section, the VNAV section between adjacent APs is determined with respect to an overlapping channel to be shared, and wherein after determining the VNAV section, each AP and stations (STAs) within a corresponding basic service set (BSS) suspend channel user for the adjacent AP and STAs within the corresponding BSS, in a corresponding VNAV.

8. The method of claim 7, wherein the adjacent AP presence determining operation exchanges a message between the first AP and an AP belonging to a BSS different from the first AP, to thereby determine whether an OBSS is present, and determines the AP belonging to the OBSS as the second AP when the OBSS is present.

9. The method of claim 7, further comprising:

a channel change controlling operation of controlling the operation channel of the first AP to be changed with a channel that non-overlaps the operation channel of the second AP, when setting of the non-overlapping operation channel is determined to be possible.

10. The method of claim 7, wherein the channel sharing controlling operation notifies an AP or a wireless device, belonging to the same BSS as the first AP, with information about the time section, and disallows the AP or the wireless device belonging to the same BSS as the first AP to use the shared channel in the time section.

11. The method of claim 7, wherein the interference avoidance method is performed for data communication between heterogeneous wireless devices, or performed by a wireless device that desires to communicate with another wireless device through the first AP.

* * * * *